(12) United States Patent
Törngren

(10) Patent No.: US 10,132,617 B2
(45) Date of Patent: Nov. 20, 2018

(54) METHOD AND SYSTEM FOR MEASURING GEOMETRIC SURFACE CHARACTERISTICS OF A FLANGE SURFACE

(71) Applicant: EASY-LASER AB, Mölndal (SE)

(72) Inventor: Leif Törngren, Källered (SE)

(73) Assignee: EASY-LASER AB, Mölndal (SE)

( * ) Notice: Subject to any disclaimer, the term of this patent is extended or adjusted under 35 U.S.C. 154(b) by 395 days.

(21) Appl. No.: 15/108,629

(22) PCT Filed: Feb. 11, 2014

(86) PCT No.: PCT/EP2014/052631
§ 371 (c)(1),
(2) Date: Jun. 28, 2016

(87) PCT Pub. No.: WO2015/120881
PCT Pub. Date: Aug. 20, 2015

(65) Prior Publication Data
US 2016/0320177 A1  Nov. 3, 2016

(51) Int. Cl.
*G01B 11/24* (2006.01)
*F03D 17/00* (2016.01)
*F03D 13/20* (2016.01)

(52) U.S. Cl.
CPC .............. *G01B 11/24* (2013.01); *F03D 17/00* (2016.05); *F03D 13/20* (2016.05);
(Continued)

(58) Field of Classification Search
CPC .... G01B 11/24; G01B 2210/52; G01B 11/30; G01B 11/303; G01B 11/306; F03D 17/00; F05B 2260/83
See application file for complete search history.

(56) References Cited

U.S. PATENT DOCUMENTS 6,826,299 B2  11/2004  Brown et al.
6,990,215 B1   1/2006  Brown et al.
(Continued)

FOREIGN PATENT DOCUMENTS

| CN | 102252637 A | 11/2011 |
| DE | 10 2008 035 480 A1 | 2/2010 |
| KR | 2012-0057711 A | 6/2012 |

OTHER PUBLICATIONS

International Search Report (PCT/ISA/210) dated Jun. 20, 2014, by the European Patent Office as the International Searching Authority for International Application No. PCT/EP2014/052631.

*Primary Examiner* — Hina F Ayub
*Assistant Examiner* — Amanda Merlino
(74) *Attorney, Agent, or Firm* — Buchanan Ingersoll & Rooney P.C.

(57) ABSTRACT

A method for measuring geometric surface characteristics of a flange surface positioned at an end of a tubular object, such as sections of a wind power generation tower. Also, a corresponding system. The method includes optically measuring, in each of a plurality of rotational positions of the tubular object, a set of measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange.

14 Claims, 5 Drawing Sheets

(52) U.S. Cl.
CPC ....... *F05B 2220/32* (2013.01); *F05B 2260/83* (2013.01); *G01B 2210/52* (2013.01)

(56) References Cited

U.S. PATENT DOCUMENTS

| | | |
|---|---|---|
| 7,403,294 B2 | 7/2008 | Handman et al. |
| 7,454,265 B2 * | 11/2008 | Marsh .................. G01B 11/002 700/159 |
| 8,240,044 B2 | 8/2012 | Shiraishi et al. |
| 2012/0013916 A1 | 1/2012 | Osaki |

\* cited by examiner

METHOD AND SYSTEM FOR MEASURING GEOMETRIC SURFACE CHARACTERISTICS OF A FLANGE SURFACE

TECHNICAL FIELD

The present invention is related to a method and system for measuring geometric surface characteristics of a flange surface positioned at an end of a tubular object, such as a section of a wind power generation tower.

BACKGROUND

In the manufacture, assembly and adjustment of many industrial processes and applications there is often a need to obtain accurate and precise measurements of geometric surface characteristics, e.g. to determine the flatness of the surface, determine the degree of inclination at different areas, etc. To this end, various techniques have been developed over the years.

One such technique is to user laser beams or other electromagnetic radiation, and measure the point of impact on sensors, such as position sensing devices (PSD) or the like. Such methods are e.g. disclosed in U.S. Pat. No. 7,403,294 and DE 10 2008 035 480.

Another approach has been to use photogrammetry, wherein targets are arranged on the subject to be measured, and photographs are taken from different angles. By processing the images, e.g. by means of triangulation, the geometric position of the targets may be calculated, and be used to determine the geometric surface characteristics of the surface of the object. Such solutions are e.g. discussed in U.S. Pat. No. 6,826,299 and U.S. Pat. No. 6,990,215.

However, some objects are more difficult to measure precisely than others. It has been found that flanges arranged on tubular objects, and in particular very large tubular objects, are very cumbersome and costly to measure with conventional techniques, and that the measurement results suffer from errors making the measurement data less reliable. This is e.g. the case when measuring wind power generation towers. These towers are made by tubular, slightly conical sections, being assembled together at the site of use. The connections between the sections are made by connecting flanges together with bolts or the like. The towers are often very high, and have to endure very strong lateral forces. Further, the flanges need to have a well-defined radial inclination, in order to ensure that the outer periphery, in case of inwardly oriented flanges, at all places remain in full contact, and to ensure that there is not too much load on the bolts. Inadequate peripheral contact would create instability, and a great risk of bolt failure when subject to external forces. To this end, to ensure that the flatness and radial inclination of the flanges are always within correct and acceptable tolerances is of utmost importance. However, these tower sections are often very large, often having a cross-sectional diameter of several meters, and frequently even between 5 and 10 meters. It would be preferred to measure the flanges of these sections already during manufacturing. However, measurement of these flanges with presently known techniques is both, as a practical matter, tedious and costly, and the measurement data is often not sufficiently accurate and reliable.

To this end, it has been proposed in U.S. Pat. No. 8,240,044, to measure the towers during assembly, and to use specifically made shims to adjust the measured unevenness. However, measurement during assembly is both costly and difficult.

There is therefore a need for an improved method for measuring geometric surface characteristics of a flange surface positioned at an end of a tubular object, and in particular for very large tubular objects.

SUMMARY OF THE INVENTION

It is therefore an object of the present invention to provide a method and system for measuring geometric surface characteristics of a flange surface positioned at an end of a tubular object.

This object is achieved with a method, system and computer software according to the appended claims.

According to a first aspect of the present invention, there is provided a method for measuring geometric surface characteristics of a flange surface positioned at an end of a tubular object, the method comprising:

optically measuring, in each of a plurality of rotational position of the tubular object, a set of measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and correlating the measurements of the different arcs and their sets of measurement points to each other based on the corresponding measurement points to obtain a final estimate of the surface characteristics of the flange surface.

The sectors are preferably distinct from each other, and preferably only partially overlapping, but totally overlapping sectors may also be used in some embodiments. Thus, "sector" in the context of the present application is to be construed broadly, meaning the portion of an area, preferably having a circular circumference, enclosed by two radii and an arc, and where the radii are separated by a central angle within the general range up to 360 degrees. In the extreme case of 360 degrees, the radii will coincide. Similarly, "arc" should also be construed broadly in the context of the present application, and in an extreme extending around the whole circumference.

The method is particularly advantageous for measurement on large tubular objects, such as sections of wind power generation towers. Specifically, the method is advantageous for measuring geometric surface characteristics of a flange surface positioned at an end of a tubular object having a cross-sectional dimension exceeding 2 m, and preferably exceeding 4 m, and most preferably exceeding 5 m, such as 7 m or more, or such as in the range 5-10 m. The cross-section of the tubular object is preferably circular, but may also be oval or of any other shape. Preferably, the flange to be measured is an internal flange, i.e. a flange being inwardly directed.

The present invention is based on the realization that when measuring large tubular objects, such as sections for a wind power generation tower, the tubular object is often arranged in a vertical position in use, but is most conveniently measured when lying in a horizontal position. However, it has been realized by the present inventor that the tubular object is deformed in a horizontal position to an extent that the measurements made in horizontal position does often not accurately represent the situation in the vertical use position. First of all, the tubular object will be somewhat compressed downwards, making a originally circular cross-section slightly oval. Further, the tubular object will not rest on a totally flat surface. On the contrary, it is common practice to arrange large tubular objects on two or more roller supports or the like. Due to this, the tubular object will assume a slightly distorted and/or curved shape. This will affect the appearance of the flanges at the ends. It has also been found that the resulting deformation of the flanges will not be uniform, but will occur primarily at the upper part.

The present invention provides a very efficient remedy to this. It has been found that by optically measuring, in each of a plurality of rotational position of the tubular object, a set of measurement points at the surface of the flange arranged in a sector along an arc, this efficiently compensates for any deformation of the flanges. First of all, it is hereby possible to always measure in a part of the flange exhibiting least deformation, which would generally be the lower part of the flange. Further, by measuring the different sectors during very similar conditions, i.e. by rotating the sectors to the same zone and position, the deformations will be similar in each measured zone. Further, by providing an overlap between the sets, so that at least two measurement points of each set essentially correspond to measurement points of at least one other set of measurement points, the sector measurements may be correlated, and thereby provide a measurement of the surface characteristics of the flange surface over the entire circumference of the flange A further great advantage with the present solution is that all measurement can be made at the same, and preferably a lower, part of the tubular object, which alleviates many practical problems experienced in the past, since the part of the flange to be measured becomes easier accessible, thereby e.g. eliminating the need for ladders, sky-lifts and the like.

Separation in two sectors may in many cases be sufficient. However, preferably the step of optically measuring comprises optically measuring sets of measurement points in at least three, and preferably at least four, rotational positions of the tubular object. More than four sectors may also be used. In case two sectors are used, each sector preferably extends over an angle in the range 180-270 degrees, and preferably 180-220 degrees. In case three sectors are used, each sector preferably extends over an angle in the range 120-180 degrees, and preferably 120-140 degrees. In case four sectors are used, each sector preferably extends over an angle in the range 90-140 degrees, and preferably 90-110 degrees.

The method further preferably comprises optically measuring additional measurement points within each set of measurement points, said additional measurement points being arranged within the same sectors, but arranged at one or more arc(s) at other distance(s) from the central axis of the tubular object than the first distance. Hereby, the measurement points are arranged on arcs arranged on two or more concentric circles. In one example, the measurement points are arranged on arcs arranged on two concentric circles, preferably arranged along an inner circumference and an outer circumference of the top flange. However, it is also possible to measure along more concentric circles, such as along three or four, or even more. The number of measurement points in each concentric circle may be identical, or different. However, preferably the measurements points in each concentric circle are equidistantly separated in an angular direction. Further, it is preferred that the number of measurement points in each concentric circle is at least 6, and preferably exceeding 10.

The overlap of the sectors within at least one circle is at least extending over one measurement point at each overlap, so that each sector has at least two measurement points corresponding to measurement points of at least one other set of measurement points. This enables correlating of the different sectors together. However, preferably each overlap extends over two measurement points, or even more. This enables an even finer correlation between the measurements of the sectors, including not only absolute position, but also slope of each sector measurement. For example, the measurement of each sector may be represented as a graph relating the height over a reference plain to the angle around the central axis of the tubular object. Correlating may then be made by displacing the curves of the different sectors upward and/or downward on the height axis, and also, if at least two measurement points are included in each overlap, the slope/inclination of each graph section may also be correlated, to obtain an even better correlation.

In case each overlap extend over several measurement points, such as two, three or more, or even in an extreme include all measurement points, i.e. where there is a total overlap between the sets of measurement points, the overlapping measurement points may, in addition to correlating the measurements of the different arcs and their sets of measurement points to each other, also be used to improve the measurement quality of all or some of the overlapping measurement points. The improved measurement quality also improves the correlation between the measurements. This may e.g. be made by calculation of the arithmetic mean value of all the measurements corresponding to the overlapping measurement point(s), by calculation of the median value for all the measurements corresponding to the overlapping measurement point(s), or the like. Hereby, an improved measurement accuracy is obtained, and less sensitivity to measurement errors and the like. In case measurement is made along two or more concentric circles, the correlation may be made based on the measurements in one of the circles. However, alternatively the correlation may be made based on several, or even all, of the concentric circles. In this case, the correlation is preferably based on a best-fit correlation, which provides an ever better accuracy. For example, this would compensate for small errors due to e.g. placing detectors at slightly displaced measuring points, etc.

The method/processor may further generate a flatness diagram showing the measured heights, or deviation at each measurement point related to a reference surface or the like, graphically. Alternatively or additionally the measurement data may be shown as tables or the like. Further, the measurement apparatus/system preferably comprises a display that displays the flatness diagram or other graphical or visual presentation of the measurement data.

Preferably, all measurements are made when the tubular object is arranged in an essentially horizontal position. Further, the sectors being measured in each rotational position are preferably all arranged in a lower part of the tubular object. This is of advantage, since it has been found that most deformation occurs at the upper area.

The geometric surface characteristics being measured is preferably at least one of: flatness of the arc(s) in relation to a plane perpendicular to the central axis of the tubular object, and radial inclination of the flange towards the central axis. In addition, other geometric surface characteristics may be measured, such as waviness and the like.

The measurement step preferably comprises optically measuring three-dimensional coordinates at each measurement point.

As one example of an optical measurement arrangement, the optically measuring comprises positioning a target at each measurement point within a sector and applying photogrammetry to the targets to spatially characterize the desired geometric feature. The photogrammetry technique is per se known, as disclosed in e.g. U.S. Pat. No. 6,826,299 and U.S. Pat. No. 6,990,215, both said document hereby incorporated in their entirety by reference.

The targets may be any type of targets useable for detection by means of photogrammetry. For example, the targets may be reflecting areas with recognizable features, or non-reflecting areas with detectable, recognizable features. Preferably, each target comprises at least two differentially detectable features having a known geometric relationship to each other. Further, the targets may be provided in the form of projected images or the like.

Preferably, the photogrammetry-applying step comprises the steps of: taking at least two photographs of a portion of the flange surface, each photograph containing at least some of the targets, each photograph taken from a different perspective relative to the object; calculating relative positions of the targets; and performing a geometric calculation on the relative positions to determine spatial coordinates of the flange surface.

The sectors, when using photogrammetry, may as discussed above, cover only a limited, lower section of the flange at a time. However, the sectors may also cover a great part of the whole circumference, such as ¾ of the circumference, and e.g. only omitting the upper section in each measurement set. Thus, a very large overlap would be provided, but at the same time, the sections with largest deformations may still be omitted.

However, the sectors may also be totally overlapping. In this case, each sector will preferably cover the whole circumference, and all measurement points will be measured in each rotational position. As discussed above, the many overlapping measurement points may then be used to improve the correlation of the measurements made at different rotational positions, and in the end to improve the final estimate of the surface characteristics of the flange surface, by calculation of the arithmetic mean value of all the measurements corresponding to each measurement point, by calculation of the median value for all the measurements corresponding to each measurement point, or the like.

The photograph-taking step preferably comprises taking digital photographs, and wherein the calculating and performing steps are performed in a computer having photogrammetric analysis software resident therein.

Alternatively, the optically measuring comprises positioning a sensor, simultaneously or consecutively, at each measurement point within a sector, generating electromagnetic radiation in the form of infrared, visible, or ultraviolet light by an electromagnetic radiation source in a plane being parallel or close to parallel to the flange surface, measuring the incident electromagnetic radiation in each sensor, and use the sensor data to spatially characterize the desired geometric feature. Such measurements may e.g. be made in accordance with the general methodology described in U.S. Pat. No. 7,403,294 and DE 10 2008 035 480, said documents hereby being incorporated by reference in their entirety.

For example, the sensor may be moved around manually, and be arranged at the various measurement points to be measured. Further, a normalization can be made based on the measured points, e.g. in accordance with a best-fit, peak-to-peak methodology, whereby there is no need to adjust the laser, or other type of electromagnetic radiation, to be in a plane absolutely parallel to the flange plane.

However, the laser plane (or plane of other electromagnetic radiation) can be coarsely adjusted by means of e.g. targets, arranged to see that the laser impinges on about the same location when the target is moved, or by lode line measurements or the like.

For measurements of new sectors, the electromagnetic radiation source may be removed and refitted, and then the process is repeated again, with the detectors being arranged at various measurement positions for measurement. However, it may also be possible, at least for some consecutive sectors, to allow the electromagnetic radiation source to be maintained in the same position during measurements of several different sectors.

The sensor data preferably comprises at least height of the incident electromagnetic radiation relative to the flange surface. Thus, light-sensitive measuring surface of the position detector(s) may provide electric signals corresponding to coordinates of the instantaneous point of impingement of the light beam on the measuring surface in response to impingement of the electromagnetic radiation thereon.

The electromagnetic radiation source is preferably a laser source or an electromagnetic radiation emitting source, and preferably a rotary laser beam transmitter, such as a rotary laser beam transmitter being rotatable about an axis at a constant rotary speed and adapted to emit at least one rotary laser beam in a fixed horizontal plane. However, in addition to a spin laser, which in itself defines a laser plane, or a fan shaped laser, it is also possible to use a single laser beam, which is repositioned between measurements in various directions, and thereby defines a measurement plane.

The sensor is preferably a photosensitive position sensors with a light-sensitive measuring surfaces, and preferably one of a semiconductor sensor, a position sensing device (PSD) and a pixel-oriented sensor, such as of a CMOS or CCD construction.

Further, the laser (or any other electromagnetic radiation) transmitter may deliver a pulsed laser beam for producing a pulse train comprised of a plurality of individual pulses on the at least one photosensitive position sensor. The pulses may be representative of a length in time and a phase angle of the laser beam. Further, the pulses may also be representative of a location of impingement on the sensor of the laser beam.

Still further, other optical measurement methods, apart from the ones discussed above, may also be used in conjunction with the present invention. For example, it is possible to use theodolite measurements, wherein a theodolite apparatus is used to measure distance and angles based on reflection to various targets or the like. Theodolite apparatus are per se well known, and are precision instruments for measuring angles in the horizontal and vertical planes. When the telescope is pointed at a target object, the angle of each of these axes can be measured with great precision. In today's theodolites, the reading out of the horizontal and vertical circles is usually done electronically. The readout is done by a rotary encoder, which can be absolute, e.g. using Gray codes, or incremental, using equidistant light and dark radial bands. Additionally, lately CCD sensors have been added to the focal plane of the telescope allowing both auto-targeting and the automated measurement of residual target offset. All this may be implemented in embedded software.

Also, modern theodolites may be equipped with integrated electro-optical distance measuring devices, generally infrared based, allowing the measurement in one go of complete three-dimensional vectors.

According to a further aspect of the present invention, there is provided a system for measuring a surface characteristics of a flange surface positioned at an end of a tubular object, the system comprising:

an optical measurement arrangement for measuring, in each of a plurality of rotational position of the tubular object, a set of measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and a central processor unit arranged to receive sets of measurement points of said plurality of rotational position of the tubular object and to correlate the measurements of the different arcs and their sets of measurement points to each other based on the corresponding measurement points to obtain a final estimate of the surface of the flange.

According to this aspect, similar advantages and preferred features and the like as in the above-discussed aspects of the invention may be contemplated.

According to another aspect of the present invention, there is provided a computer readable medium comprising, stored thereon, a computer software for executing a process for determining a geometric surface characteristics of a flange surface positioned at an end of a tubular object, the process comprising the steps:

receiving optical measurement data comprising sets of measurements made at measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and correlating the measurements of the different arcs and their sets of measurement points to each other based on the corresponding measurement points to obtain a final estimate of the surface characteristics of the flange surface.

According to this aspect, similar advantages and preferred features and the like as in the above-discussed aspects of the invention may be contemplated.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 schematically illustrates various types of deformation that may occur in a flange arranged at end of a tubular object.

FIG. 4 illustrates a laser measurement arrangement useable in connection with one embodiment of the present invention, wherein

DETAILED DESCRIPTION OF EMBODIMENTS

Figure 1A:
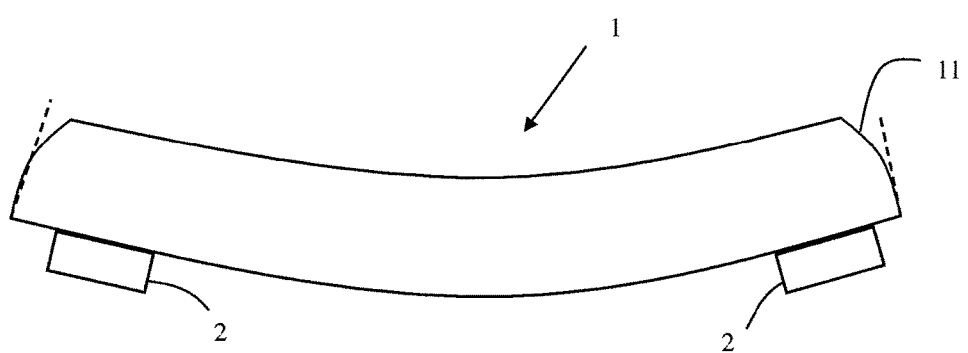
FIG. 1a is a side view seen towards the side of a tubular object, illustrating in great exaggeration, some deformations that may occur when the tubular object is arranged in a horizontal position.

In the following detailed description, preferred embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention. Even though in the following description, numerous specific details are set forth to provide a more thorough understanding of e present invention, it will be apparent to one skilled in the art that the present invention may be practiced without these specific details. In other instances, well known constructions or functions are not described in detail, so as not to obscure the present invention.

The method and system of the present invention is particularly advantageous for measurement on large tubular objects, such as sections of wind power generation towers. When such tubular objects are arranged in a horizontal position, it has been found that different types of deformation will occur at the end(s) having flange(s) to be measured. Some of these deformations are shown, in great exaggeration, in FIGS. 1a and 1b.

In FIG. 1a, a tubular object 1 is arranged in a horizontal position, and being arranged on supports 2, allowing the tubular object to be rotated around its central axis. One type of deformation occurring in such tubular objects is that the tubular object 1 will assume a slightly curved shape, as is schematically illustrated in FIG. 1a. This will affect the appearance of the flanges at the ends 11. It has also been found that the resulting deformation of the flanges will not be uniform, but will to a greater degree affect the upper part, as is illustrated schematically in FIG. 1a.

Figure 1B:
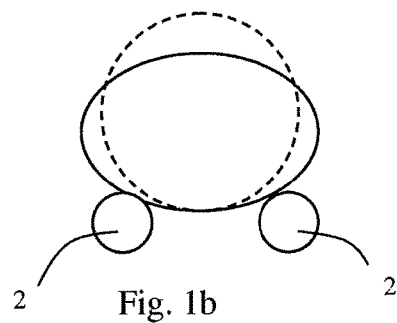
FIG. 1b is a side view seen towards the end of the tubular object, illustrating in great exaggeration, some further deformations that may occur when the tubular object is arranged in a horizontal position.

Further, as is shown in FIG. 1b, the tubular object will be somewhat compressed downwards, making the originally circular cross-section (dashed line) slightly oval (solid line).

For measuring a geometric surface characteristics of the flange surface positioned at an end of the tubular object, a set of measurement points at the surface of the flange is first optically measured in a first rotational position of the tubular object. The measurement points are arranged in a sector along an arc at a first distance from the central axis of the tubular object, and are further separated in a circumference direction of the flange. The tubular object is rotated into a second rotational position, and a further set of measurement points are optically measured. These additional measurement points are also arranged in a sector along an arc at the first distance from the central axis of the tubular object, and are also separated in a circumference direction of the flange. One or more sectors and set(s) of measurement points may be measured in the same way, in one or more additional rotational position of the tubular object. The arcs together extend over the entire circumference of the flange. Further, the sectors and arcs are distinct but at least partly overlapping, so that at least two measurement points of each set essentially correspond to measurement points of at least one other set of measurement points. Based on this overlap, the measurements of the different arcs and their sets of measurement points can subsequently be correlated to each other to obtain a final estimate of the surface characteristics of the flange surface.

Preferably, the measurements are preferably made during very similar conditions, i.e. by rotating the sectors to the same zone and position. Preferably, the measurement takes place in a lower part of the tubular object.

The method further preferably comprises optically measuring additional measurement points within each set of measurement points, said additional measurement points being arranged within the same sectors, but arranged at one or more arc(s) at other distance(s) from the central axis of the tubular object than the first distance. Hereby, the measurement points are arranged on arcs arranged on two or more concentric circles. In one example, the measurement points are arranged on arcs arranged on two concentric circles, preferably arranged along an inner circumference and an outer circumference of the top flange. However, it is also possible to measure along more concentric circles, such as along three or four, or even more. The number of measurement points in each concentric circle may be identical, or different. However, preferably the measurements points in each concentric circle are equidistantly separated in an angular direction. Further, it is preferred that the number of measurement points in each concentric circle is at least 6, and preferably exceeding 10.

Figure 2:
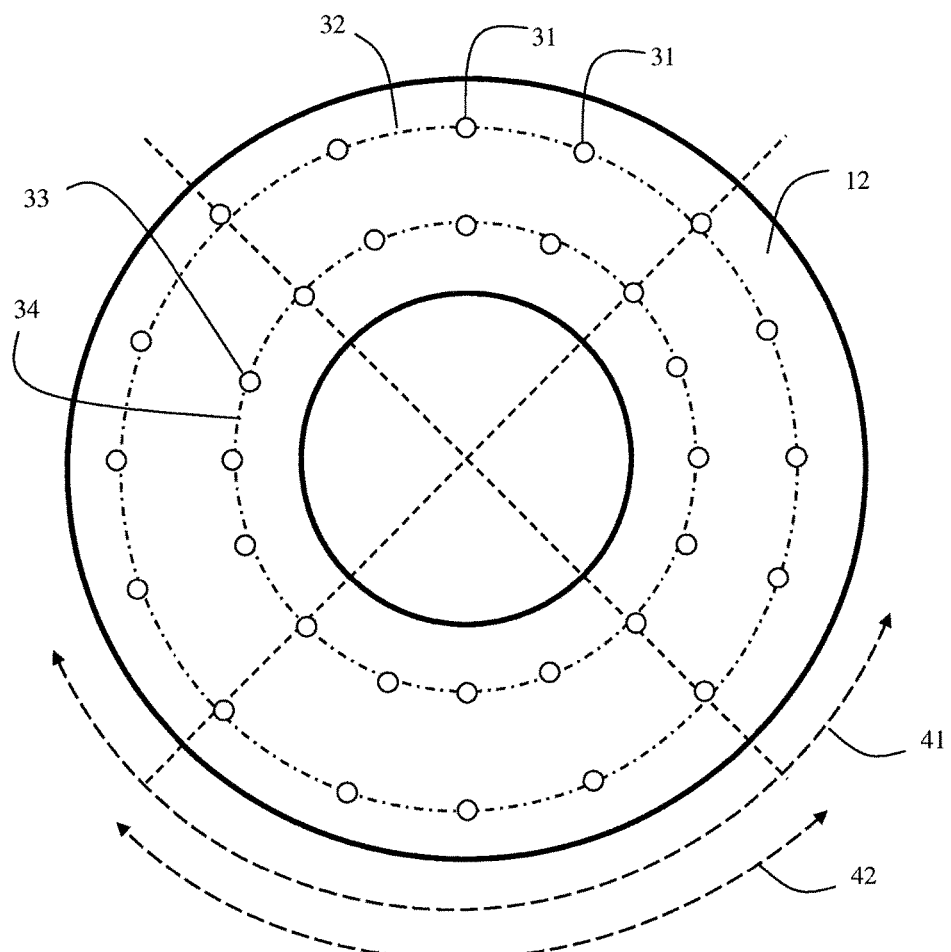
FIG. 2 schematically illustrates in a side view a flange to be measured, and the positioning of measurement points along two concentric circles around the circumference.

In the example illustrated in FIG. 2, four sectors are used. However, more than four sectors may be used, as well as three or two. In this embodiment, the measurement points are arranged along two concentric circles 32, 34. Each concentric circle here comprises 16 measurement points 31, 33. However, more or fewer measurement points may be used in each circle, such as 12 or 8. Further, the number of measurement points need not be the same in every circle. For example, one circle may comprise 16 measurement points, another 8, etc. Preferably the measurements points in each concentric circle are equidistantly separated in an angular direction. Further, it is preferred that the number of measurement points in each concentric circle is at least 6, and preferably exceeding 10.

In the example of FIG. 2, the overlap between each pair of adjacent sets of measurement points may be one measurement point, so that each set in total comprises two measurement points essentially corresponding to measurement points of other sets of measurement points, i.e. one at each end. Such arcs, extending over a sector angle of about 90 degrees are schematically illustrated as 42. However, the arcs may also have a greater overlap, e.g. extending over three measurements points, such as illustrated by the arc 41, extending over an angle of about 135 degrees. A greater overlap provides a better possibility of obtaining an exact correlation. Naturally, it is also possible to use an overlap extending over more than three measurement points, such as four or five. In an extreme, each sector may extend over the whole circumference, and the overlap then be extending over all measurement points.

Figure 3A:
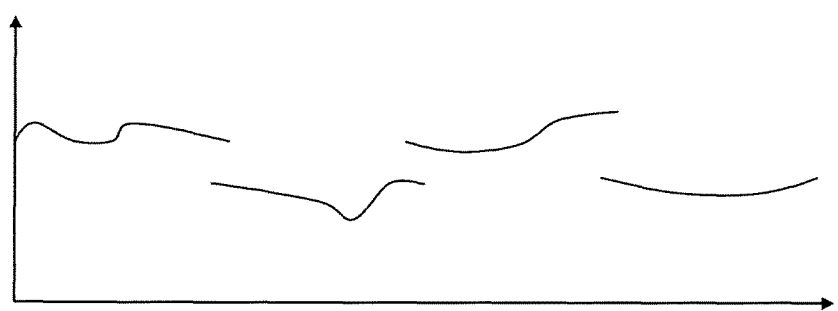
FIG. 3 schematically illustrates correlation of graphs of measurements made in different sectors, wherein FIG. 3a illustrate the measurement graphs in an initial, uncorrelated state, whereas FIG. 3b illustrate the measurement graphs in a subsequent, correlated state.
Figure 3B:
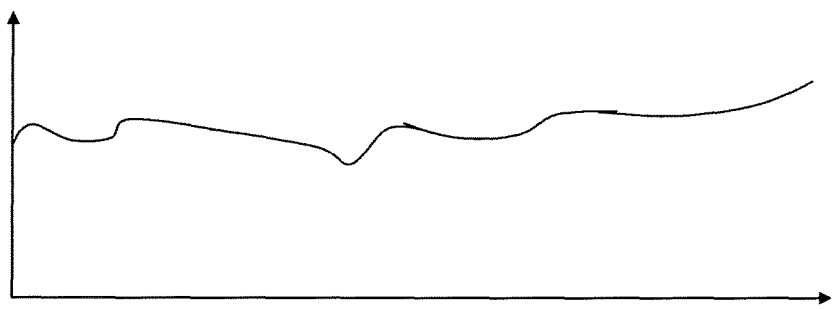

For example, the measurement of each sector along a concentric circle may be represented as a graph relating the height over a reference plain to the angle around the central axis of the tubular object. Such graphs are illustrated in FIG. 3a, wherein the y-axis represents height relative a reference plane, and the x-axis represents the angular position around a central axis of the tubular object. Correlation of the graphs may then be made by displacing the curves of the different sectors upward and/or downward on the height axis, and also, if at least two measurement points are included in each overlap, the slope/inclination of each graph section may also be correlated, to obtain an even better correlation. Such a correlated curve, corresponding to the segments of FIG. 3a is illustrated in FIG. 3b.

In case measurement is made along two or more concentric circles, as in the example of FIG. 2, the correlation may be made based on the measurements in one of the circles. However, alternatively the correlation may be made based on several, or even all, of the concentric circles. In this case, the correlation is preferably based on a best-fit correlation, which provides an ever better accuracy. For example, this would compensate for small errors due to e.g. placing detectors at slightly displaced measuring points, etc.

The geometric surface characteristics being measured is preferably at least one of: flatness of the arc(s) in relation to a plane perpendicular to the central axis of the tubular object, and radial inclination of the flange towards the central axis. In addition, other geometric surface characteristics may be measured, such as waviness and the like. The result of the measurement may be presented to the user/operator by means of numeric data, e.g. provided in the form of tables, or as graphical representations, such as illustration in diagrams, or other graphical visualizations. For example, a flatness diagram may be used to show the measured heights, or deviation at each measurement point related to a reference surface or the like, graphically. Different combinations of these or other representations may also be used.

The measurement step preferably comprises optically measuring three-dimensional coordinates at each measurement point.

Figure 4A:
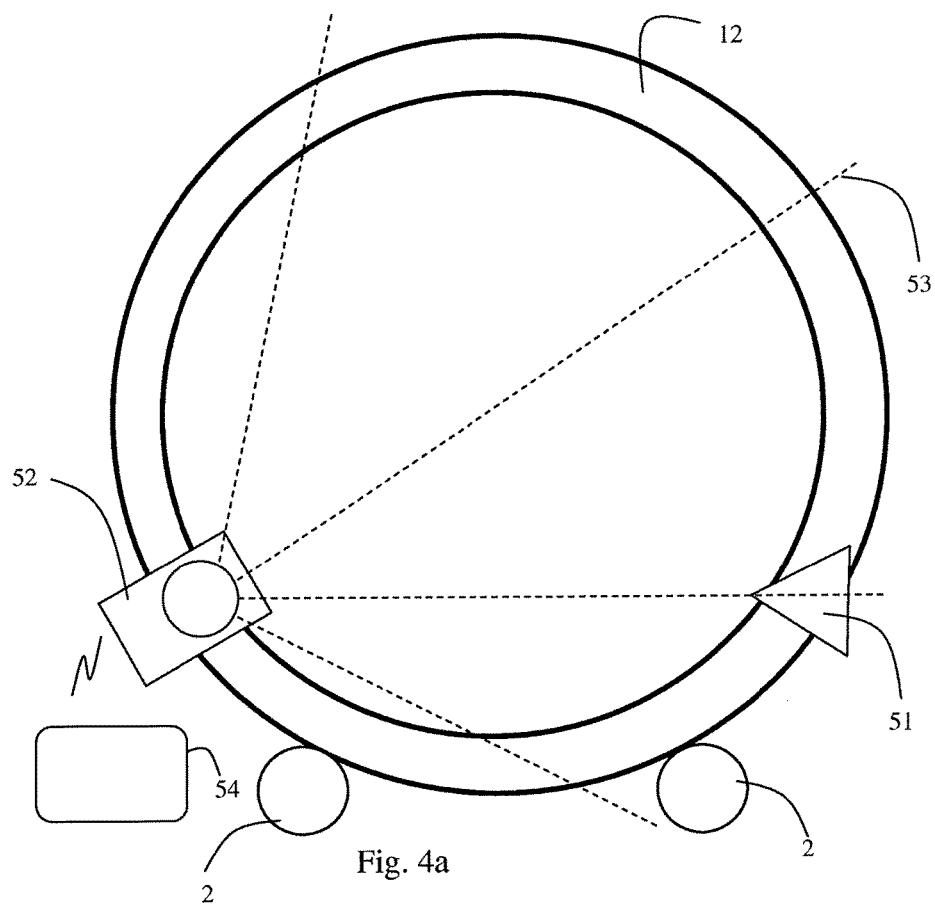
FIG. 4a shows a side view seen towards the end of the tubular object.
Figure 4B:
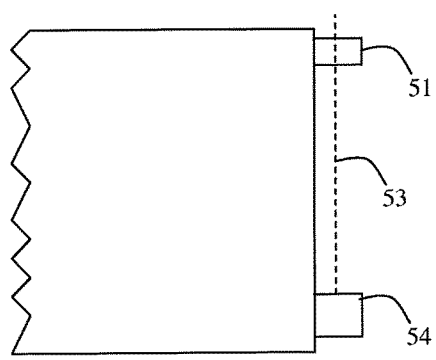
FIG. 4b shows the same measurement arrangement in a side view seen towards the side of the tubular object.

According to one alternative embodiment, as illustrated schematically in FIGS. 4a and 4b, the optically measuring comprises positioning a sensor 51, simultaneously or consecutively, at each measurement point within a sector, generating electromagnetic radiation in the form of infrared, visible, or ultraviolet light by an electromagnetic radiation source 52 in a plane 53 being parallel or close to parallel to the flange surface. For example, the sensor(s) 51 may be moved around manually, and be arranged at the various measurement points to be measured. Further, a normalization can be made based on the measured points, e.g. in accordance with a best-fit, peak-to-peak methodology, whereby there is no need to adjust the laser, or other type of electromagnetic radiation, to be in a plane absolutely parallel to the flange plane. However, the laser plane (or plane of other electromagnetic radiation) can be coarsely adjusted by means of e.g. targets, arranged to see that the laser impinges on about the same location when the target is moved, or by lode line measurements or the like. The incident electromagnetic radiation is measured in the sensor(s) 51, and the sensor data is used to spatially characterize the desired geometric feature. Such measurements may e.g. be made in accordance with the general methodology described in U.S. Pat. No. 7,403,294 and DE 10 2008 035 480, said documents hereby being incorporated by reference in their entirety.

For measurements of new sectors, the electromagnetic radiation source may be removed and refitted, and then the process is repeated again, with the detectors being arranged at various measurement positions for measurement. However, it may also be possible, at least for some consecutive sectors, to allow the electromagnetic radiation source to be maintained in the same position during measurements of several different sectors.

The sensor data preferably comprises at least height of the incident electromagnetic radiation relative to the flange surface. Thus, light-sensitive measuring surface of the position detector(s) may provide electric signals corresponding to coordinates of the instantaneous point of impingement of the light beam on the measuring surface in response to impingement of the electromagnetic radiation thereon.

The electromagnetic radiation source is preferably a laser source or an electromagnetic radiation emitting source, and preferably a rotary laser beam transmitter, such as a rotary laser beam transmitter being rotatable about an axis at a constant rotary speed and adapted to emit at least one rotary laser beam in a fixed horizontal plane. However, in addition to a spin laser, which in itself defines a laser plane, or a fan shaped laser, it is also possible to use a single laser beam, which is repositioned between measurements in various directions, and thereby defines a measurement plane.

The sensor is preferably a photosensitive position sensors with a light-sensitive measuring surfaces, and preferably one of a semiconductor sensor, a position sensing device (PSD) and a pixel-oriented sensor, such as of a CMOS or CCD construction.

Further, the laser (or any other electromagnetic radiation) transmitter may deliver a pulsed laser beam for producing a pulse train comprised of a plurality of individual pulses on the at least one photosensitive position sensor. The pulses may be representative of a length in time and a phase angle of the laser beam. Further, the pulses may also be representative of a location of impingement on the sensor of the laser beam.

A controller or central processor unit 54, such as a computer, is arranged to receive the measurement data, and to perform the processing and correlation of the measurement data. The communication between the controller 54 and the electromagnetic radiation source 52 and/or the sensor(s) 51 may occur via a wired communication path, or via a wireless communication path, such as using e.g. Bluetooth or the like. The controller may be a dedicated computer, a smart phone, a tablet computer, a personal computer, or the like. Further, the controller preferably comprises or is connected to a display, for presentation of the processed measurement result. The controller comprises a data processor, with programmable circuitry or a software based control system to receive and interpret the signals representing the measurements.

Figure 5:
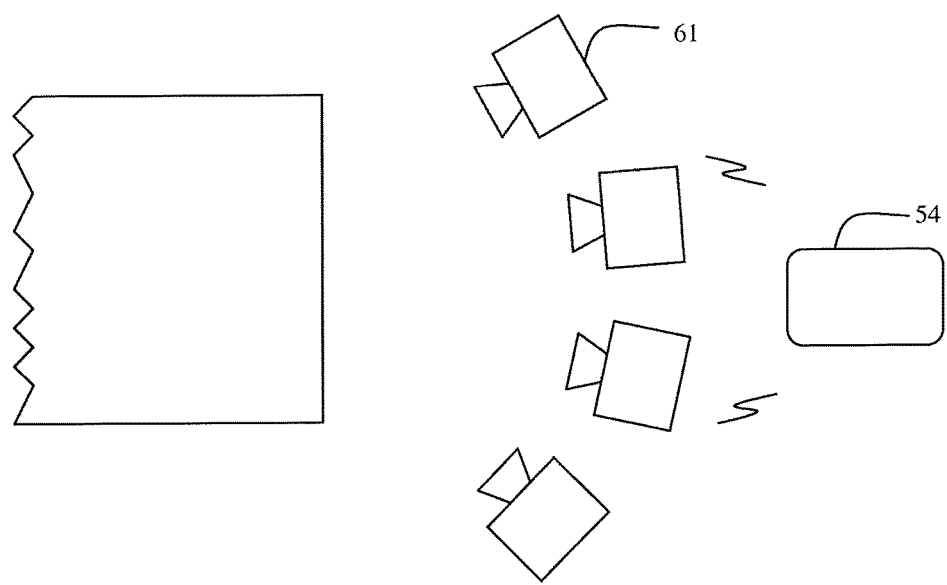
FIG. 5 illustrates in a side view seen from above of a photogrammetry-based measurement arrangement according to another embodiment of the present invention.

According to another exemplary embodiment of the optical measurement arrangement, illustrated in FIG. 5, the optically measuring comprises positioning a target at each measurement point within a sector and applying photogrammetry to the targets to spatially characterize the desired geometric feature. The photogrammetry technique is per se known, as disclosed in e.g. U.S. Pat. No. 6,826,299 and U.S. Pat. No. 6,990,215, both said document hereby incorporated in their entirety by reference. Targets may also be provided at all measurement points at the flange from the start.

The targets may be any type of targets useable for detection by means of photogrammetry. For example, the targets may be reflecting areas with recognizable features, or non-reflecting areas with detectable, recognizable features. Preferably, each target comprises at least two differentially detectable features having a known geometric relationship to each other. Further, the targets may be provided in the form of projected images or the like.

Preferably, the photogrammetry-applying step comprises the steps of: taking at least two photographs of a portion or the whole of the flange surface, each photograph containing at least some of the targets, each photograph taken from a different perspective relative to the object; calculating relative positions of the targets; and performing a geometric calculation on the relative positions to determine spatial coordinates of the flange surface. This is then repeated, as in the previously discussed embodiment, in one, two, three or more further rotational positions of the tubular object. Preferably, the different photographs are taken by different cameras 61, arranged at different positions. Preferably, at least two cameras are used. However, in some cases it may also be feasible to use fewer cameras, e.g. by moving a camera between various positions.

The sectors, when using photogrammetry, may as discussed above, cover only a limited, lower section of the flange at a time. However, the sectors may also cover a great part of the whole circumference, such as ¾ of the circumference, or even the whole circumference, and e.g. only omitting the upper section in each measurement set. Thus, a very large overlap would be provided, but at the same time, the sections with largest deformations may still be omitted. In this case, each photograph may comprise an image of the entire flange, including all measurement points thereon, but during processing, a part of the flange, such as the upper sector, may be disregarded, and omitted from the calculations and further processing. Similarly, it is possible to measure all measurement points in all photographs, but to omit sections where the deviations from other measurements, made in other rotational positions, are greatest. Alternatively, instead of omitting sections, all measurements may be used, and instead compensation may occur by calculating an arithmetic mean or median value of all the measurements corresponding to each measurement point.

The photograph-taking step preferably comprises taking digital photographs. The measurement data is, as in the previously discussed embodiment, then forwarded to a controller 54, e.g. by means of wireless communication, and therein processed to calculate and perform the steps related to photogrammetric analysis by means of software resident in the controller.

Other types of optical measuring arrangements may also be used. Such as theodolite-based system. Further, the arrangements of measurement points may be varied, to use more or fewer sectors, more or fewer concentric circles, larger or smaller overlap areas, more or fewer measurement points within each sector and around each concentric circle, etc. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising"

does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for measuring geometric surface characteristics of a flange surface positioned at an end of a tubular object, the method comprising:
optically measuring, in each of a plurality of rotational position of the tubular object, a set of measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and
correlating the measurements of the different arcs and their sets of measurement points to each other based on the corresponding measurement points to obtain a final estimate of the surface characteristics of the flange surface, wherein all measurements are made when the tubular object is arranged in an essentially horizontal position and the sectors being measured in each rotational position are all arranged in a lower part of the tubular object.

2. The method of claim 1, wherein the step of optically measuring comprises optically measuring sets of measurement points in at least three rotational positions of the tubular object.

3. The method of claim 1, further comprising optically measuring additional measurement points within each set of measurement points, said additional measurement points being arranged within the same sectors, but arranged at one or more arc(s) at other distance(s) from the central axis of the tubular object than the first distance.

4. The method of claim 1, wherein the tubular object is a wind turbine generator tower section.

5. The method of claim 1, wherein the geometric surface characteristics being measured is at least one of: flatness of the arc(s) in relation to a plane perpendicular to the central axis of the tubular object, and radial inclination of the flange towards the central axis.

6. The method of claim 1, wherein the measurement step comprises optically measuring three-dimensional coordinates at each measurement point.

7. The method of claim 1, wherein the optically measuring comprises positioning a target at each measurement point within a sector and applying photogrammetry to the targets to spatially characterize the desired geometric feature.

8. The method of claim 7, wherein the photogrammetry-applying step comprises the steps of: taking at least two photographs of a portion of the flange surface, each photograph containing at least some of the targets, each photograph taken from a different perspective relative to the object; calculating relative positions of the targets; and performing a geometric calculation on the relative positions to determine spatial coordinates of the flange surface.

9. The method of claim 1, wherein the optically measuring comprises positioning a sensor, simultaneously or consecutively, at each measurement point within a sector, generating electromagnetic radiation in the form of infrared, visible, or ultraviolet light by an electromagnetic radiation source in a plane being parallel or close to parallel to the flange surface, measuring the incident electromagnetic radiation in each sensor, and use the sensor data to spatially characterize the desired geometric feature.

10. The method of claim 9, wherein the sensor data comprises at least height of the incident electromagnetic radiation relative to the flange surface.

11. The method of claim 9, wherein the electromagnetic radiation source is a laser source or an electromagnetic radiation emitting source.

12. The method of claim 9, wherein the sensor is a photosensitive position sensors with a light-sensitive measuring surfaces.

13. A system for measuring a surface characteristics of a flange surface positioned at an end of a tubular object, the system comprising:
an optical measurement arrangement for measuring, in each of a plurality of rotational position of the tubular object, a set of measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and
a central processor unit arranged to receive sets of measurement points of said plurality of rotational position of the tubular object and to correlate the measurements of the different arcs and their sets of measurement points to each other based on the corresponding measurement points to obtain a final estimate of the surface of the flange, wherein all measurements are made when the tubular object is arranged in an essentially horizontal position and the sectors being measured in each rotational position are all arranged in a lower part of the tubular object.

14. A computer readable medium comprising, stored thereon, a computer software for executing a process for determining a geometric surface characteristics of a flange surface positioned at an end of a tubular object, the process comprising the steps:
receiving optical measurement data comprising sets of measurements made at measurement points at the surface of the flange, each set of measurement points being arranged in a sector along an arc at a first distance from the central axis of the tubular object, and being separated in a circumference direction of the flange, wherein said sectors are at least partly overlapping, so that at least two measurement points of each set essentially correspond to measurement points of at least one other set of measurement points, and wherein the arcs together extend over the entire circumference of the flange; and
correlating the measurements of the different arcs and their sets of measurement points to each other based on the corresponding measurement points to obtain a final estimate of the surface characteristics of the flange surface, wherein all measurements are made when the tubular object is arranged in an essentially horizontal position and the sectors being measured in each rotational position are all arranged in a lower part of the tubular object.

* * * * *